Aug. 4, 1931.  R. H. HAMILTON  1,817,620
SELF ADJUSTING TAPPET
Filed Jan. 8, 1931
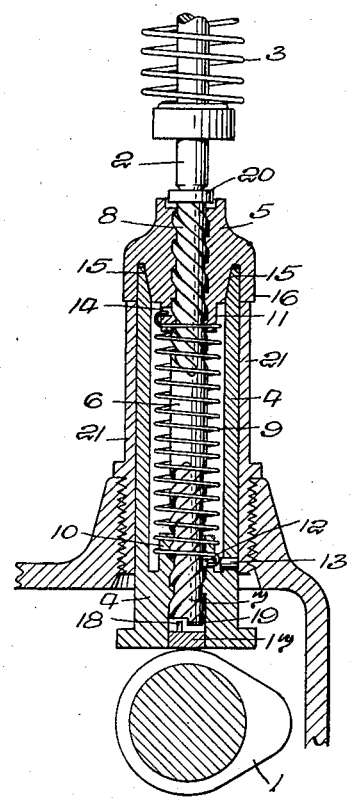
INVENTOR:
REGINALD HAROLD HAMILTON
BY:
ATTORNEYS Patented Aug. 4, 1931

1,817,620

UNITED STATES PATENT OFFICE

REGINALD HAROLD HAMILTON, OF ST. ALBANS, NEW ZEALAND

SELF ADJUSTING TAPPET

Application filed January 8, 1931, Serial No. 507,320, and in New Zealand July 31, 1930.

This invention relates to tappets by means of which intermittent one-way thrust motion is communicated from a driving to a driven part, such for example as the tappets employed between the cam-shaft and the poppet-valves of an engine.

It is the object of the present invention to provide a tappet of novel and special construction whereby the necessary adjustment of its length will occur automatically while the same is in use, thereby eliminating the necessity for manual adjustment and enabling such tappet to be operated with smaller clearances than would be practicable with a tappet of the manually adjusted type, the said construction being such as to enable the tappet to be simply manufactured and maintained in working order for long periods without attention.

In order that the nature of the invention and its construction may be clearly understood, it will now be fully described and explained with reference to the accompanying drawing which illustrates in sectional elevation a tappet in accordance with the invention, together with parts co-operating therewith.

To clearly illustrate its functions the tappet is here shown as a means of communicating the thrust action of a cam 1 to the stem 2 of a valve which latter is opened by such action against the opposing tendency of a valve-spring 3, as customary.

The tappet is however equally adapted for use in other forms of mechanism in which an intermittent one-way thrust between a driving and a driven part is required.

In construction the tappet comprises a sleeve 4 having one open end on which is adapted to seat a head 5, while extending axially through the latter and within the sleeve 4 is a spindle 6 having right and left handed screw threads one of which, as 7 is tapped into the sleeve 4 while the other, as 8 is tapped into the head 5.

Connecting between the said sleeve 4 and head 5 also is a spring 9, preferably a torsion spring, tending to turn such parts mutually in the required opposite directions to screw the spindle 6 outwardly through the head 5.

In thus acting in torsion between the head 5 and the sleeve 4 the spring 9 serves also to maintain the various threads in contact in one constant direction, thereby eliminating any back-lash or lost motion that might otherwise occur in the working of the parts in the event of such threads becoming loose fitting as the result of wear.

The said spring 9 is housed within the sleeve 4, a small boss 10 being preferably provided in such sleeve to be received within one end of such spring, while the other end portion of the latter preferably receives a similar boss 11 provided upon the head 5, such bosses serving to keep the spring central within the sleeve and prevent its coming in contact with the spindle 6.

The anchoring of the ends of the spring to the sleeve and head is effected in any convenient or appropriate manner. Thus for example as here shown one end of such spring may be hooked and its extremity inserted in a radial hole 12 in the boss 10 and in which position such hooked portion is retained by means of a plug 13 driven into an extension of such hole of relatively larger diameter formed through the outer portion of the sleeve, while the other or opposite end of such spring may be similarly hooked and its extremity inserted in a radial hole 14 in the boss 11.

The head 5 is adapted also to frictionally engage the sleeve when seated thereon in order to retain such parts from axial turning in relation to each other, this being preferably accomplished as here shown by forming such parts with corresponding tapering surfaces 15 adapted to engage one another when the head is fully seated upon the sleeve.

The head is preferably of greater external diameter than that of the sleeve and provided with a flange 16 adapted to slidably embrace a portion of such sleeve at its open end, such flange serving to guide the head in its movements in relation to the sleeve and to exclude dust and other foreign matter from the interior of the sleeve.

Provision is preferably made for limiting the said outward screwing movement of the spindle 6 under action of the spring 9. This may be conveniently accomplished as here shown by continuing the bore of such sleeve in which its said thread is formed, right through the end of such sleeve and fitting in such end of the bore beyond the spindle, a plug 17 having an eccentricaly arranged projection 18 engageable with an eccentric projection 19 upon the end of the spindle.

The end of the spindle 6 projecting through the head 5 constitutes one operative end of the tappet and is preferably provided with a cap 20 held in position by means of a spigot received in an axial hole in the end of the spindle or by means of a flange to fit around the periphery thereof, while the opposite end of the sleeve constitutes the other operative end of the tappet.

The tappet will be arranged with its said projecting end of the spindle actable upon the driven part 2, while the opposite end of the sleeve will be engageable by the driving part, such tappet being mounted to be capable of longitudinal reciprocation between such driving and driven parts, as by arranging the sleeve within a tappet-guide 21 as customary.

Provision is made also for arresting the head 5 at a predetermined limit of proximity to the driving part, in order to cause such head to be released from its said frictional engagement with the sleeve, such purpose being conveniently accomplished as here shown by arranging the edge of the flange 16 to come in contact with the end of the tappet-guide 21 as the tappet completes its movement towards the driving part 1.

This releasing of the frictional engagement when the head is arrested is assisted by the axial turning tendency exerted on the head 5 and sleeve 4 by the torsion spring 9.

In operation, when the tappet is in its position of rest, as here shown, the head 5 being in contact with the end of the guide 21, will be slightly unseated from the end of the sleeve 4 thereby breaking the frictional engagement between the tapered surfaces 15 and so permitting relative axial turning movement between the head 5 and sleeve 4 to take place.

The action of the spring 9, as hereinbefore explained tends to turn the head 5 and sleeve 4 in the required opposite directions to screw the spindle 6 outward through such head. Should the tappet be too short to fit closely between the driving and driven parts therefore an outward movement of such spindle sufficient to make up the deficiency will take place, while in the event of the tappet being too long, and so preventing the driven part from seating or reaching its position of rest, the pressure exerted by such driven part upon the end of the spindle will force the latter inward, the necessary relative turning movement of the head 5 and sleeve 4 occurring against the tendency of the spring 9.

In this manner therefore automatic adjustment of the length of the tappet will be possible, and will if necessary occur, each time the tappet reaches its position of rest.

When the movement of the tappet under action of the driving part commences however the head 5 will become fully seated upon the end of the sleeve, thus restoring the frictional grip between the tapered faces 15 which effectually restrains the head and sleeve against further relative turning.

The parts of the tappet therefore become locked in those positions in which they had been adjusted as above mentioned, thus causing such tappet to act rigidly in the required manner between the driving and driven member until it again reaches its position of rest.

The means previously mentioned for limiting the outward movement of the spindle, such as the projections 18 and 19, do not perform any function in connection with the ordinary operation of the tappet, but are useful nevertheless in preventing excessive outward movement of the spindle when the tappet is disassembled from the other parts, and such provision would moreover serve to prevent the spindle from becoming seriously displaced in the event of an accident occurring to the driven part, such for example as breakage or failure of the spring 3.

The interior of the sleeve 4 may contain a supply of lubricant for the internal parts of the tappet.

I claim:

1. A tappet comprising a sleeve reciprocable longitudinally between a driving and a driven part, one end of said sleeve being actable upon by said driving part, a head adapted to seat upon the opposite end of said sleeve and frictionally engage therewith, a spindle disposed axially within said sleeve and through said head, said spindle being formed with a right-handed and a left-handed thread tapped one into said sleeve and the other into said head, the end of said spindle projecting through said head being actable upon said driven part, and a spring interconnecting said sleeve and said head and tending to turn such parts axially in the required opposite directions to screw said spindle outwardly through said sleeve.

2. A tappet comprising a sleeve reciprocable longitudinally between a driving and a driven part, one end of said sleeve being actable upon by said driving part, a head adapted to seat upon the opposite end of said sleeve, a spindle disposed axially within said sleeve and through said head, said spindle being formed with a right-handed and a left-handed thread tapped one into said sleeve and the other into said head, the end of said spindle projecting through said head being actable upon said driven part, a spring interconnecting said sleeve and said head and tending to turn such parts axially in the required opposite directions to screw said spindle outwardly through said head, means whereby said head frictionally engages said sleeve thereby to restrain said axial turning, and means whereby said frictional engagement is broken when the tappet occupies its position of rest thereby to permit of said axial turning movement taking place for the purpose of re-adjusting the position of said spindle.

3. A tappet as defined in claim 1, wherein said sleeve is slidable within a tappet guide, and wherein said head is arrested by contact with the end of said guide as the tappet reaches its position of rest thereby to cause said head to break its said frictional engagement with said sleeve.

4. A tappet as defined in claim 1, wherein said sleeve is slidable within a tappet guide and wherein said head is formed with a flange slidably embracing a portion of said sleeve, and wherein the edge of said flange is adapted to come in contact with the end of said guide when the tappet reaches its position of rest thereby to break said frictional engagement of said head with said sleeve.

5. A tappet as defined in claim 1 wherein said means of frictional engagement consists of corresponding mutually receivable tapered formations provided in said head and said sleeve.

6. A tappet as defined in claim 1, wherein said spring is arranged to act in torsion between said sleeve and said head.

7. A tappet as defined in claim 1 wherein means are provided for limiting the outward movement of said spindle in relation to said sleeve.

In witness whereof, I have hereunto set my hand.

REGINALD HAROLD HAMILTON.